(12) United States Patent
Silvestro et al.

(10) Patent No.: US 11,102,166 B2
(45) Date of Patent: Aug. 24, 2021

(54) EXPLICIT SERVICE FUNCTION CHAINING (SFC) USING DNS EXTENSIONS

(71) Applicant: NEC Laboratories Europe GmbH, Heidelberg (DE)

(72) Inventors: Alessio Silvestro, Heidelberg (DE); Fabian Schneider, Heidelberg-Bahnstadt (DE); Roberto Bifulco, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/300,124

(22) PCT Filed: Mar. 10, 2017

(86) PCT No.: PCT/EP2017/055743
§ 371 (c)(1),
(2) Date: Nov. 9, 2018

(87) PCT Pub. No.: WO2018/162087
PCT Pub. Date: Sep. 13, 2018

(65) Prior Publication Data
US 2019/0149508 A1   May 16, 2019

(51) Int. Cl.
*G06F 15/16* (2006.01)
*H04L 29/12* (2006.01)
(Continued)

(52) U.S. Cl.
CPC ........ *H04L 61/1511* (2013.01); *H04L 45/306* (2013.01); *H04L 45/745* (2013.01); *H04L 61/1552* (2013.01)

(58) Field of Classification Search
CPC ............... H04L 61/1511; H04L 45/745; H04L 61/1552; H04L 45/306
(Continued)

(56) References Cited

U.S. PATENT DOCUMENTS

2003/0198190 A1* 10/2003 Rajan ............... H04L 43/08
370/252
2004/0001511 A1* 1/2004 Matta ............... H04L 43/00
370/468

(Continued)

OTHER PUBLICATIONS

Xu J You Huawei R Raszuk Individual X: "DNS.SD Extensions for Service Function Discovery; draft-xu-dnssd-sf-discovery-02.txt", DNS-SD Extensions for Service Function Discovery; Draft-XU-DNSSD-SF-Discovery-02.Txt, Internet Engineering Task Force, IETF; Standardworkingdraft, Internet Society (ISOC), Sep. 1, 2015 (Sep. 1, 2015), pp. 1-9, XP015108018.

(Continued)

*Primary Examiner* — Thuong Nguyen
(74) *Attorney, Agent, or Firm* — Leydig, Voit & Mayer, Ltd.

(57) ABSTRACT

A method for service function chaining within an end-to-end path of a network connection between a source and destination node includes: executing, for a defined service function chain including an ordered sequence of network service functions, an address resolution process that translates names of the network service functions of the defined service function chain into their corresponding IP addresses. The address resolution process is performed at a name server of the destination node by a sequence of name server queries sent in succession to respective name servers of each of the selected network service functions of the defined service function chain in accordance with their order. Each of the name server queries is answered by a response from a name server of the respective network service function that includes IP addresses of selected instances of a respective network service function chosen by the respective name server according to predefined criteria.

20 Claims, 4 Drawing Sheets

(51) Int. Cl.
*H04L 12/725* (2013.01)
*H04L 12/741* (2013.01)

(58) Field of Classification Search
USPC ........ 709/238; 370/468, 235, 400, 238, 392, 370/395.52; 707/773, 798, 736
See application file for complete search history.

(56) References Cited

U.S. PATENT DOCUMENTS

| | | | | |
|---|---|---|---|---|
| 2005/0111487 A1* | 5/2005 | Matta | ................. | H04L 41/5038 |
| | | | | 370/468 |
| 2006/0018325 A1* | 1/2006 | Conrad | ............ | H04L 29/12009 |
| | | | | 370/395.52 |
| 2010/0106742 A1* | 4/2010 | Guruswamy | ........... | H04L 41/12 |
| | | | | 707/773 |
| 2010/0269174 A1* | 10/2010 | Shelest | ............ | H04L 29/12066 |
| | | | | 726/22 |
| 2014/0143281 A1* | 5/2014 | Duan | ................... | G06F 16/211 |
| | | | | 707/798 |
| 2014/0173137 A1* | 6/2014 | Jacobson | ............. | H04L 45/021 |
| | | | | 709/248 |
| 2015/0333930 A1 | 11/2015 | Aysola et al. | | |
| 2015/0350599 A1* | 12/2015 | Yang | ..................... | H04W 76/15 |
| | | | | 348/14.02 |
| 2016/0164776 A1* | 6/2016 | Biancaniello | ......... | H04L 45/306 |
| 2016/0261495 A1* | 9/2016 | Xia | ......... | H04L 45/12 |
| 2016/0269298 A1* | 9/2016 | Li | ............. | H04L 45/04 |
| 2016/0323165 A1* | 11/2016 | Boucadair | ............... | H04L 43/12 |
| 2016/0344803 A1* | 11/2016 | Batz | .................... | H04L 12/1407 |
| 2016/0380975 A1* | 12/2016 | Reddy | ................. | H04L 63/0281 |
| | | | | 726/12 |
| 2017/0034860 A1* | 2/2017 | Berggren | .............. | H04W 24/02 |
| 2017/0237656 A1* | 8/2017 | Gage | ....................... | H04L 45/74 |
| | | | | 370/392 |
| 2017/0251065 A1* | 8/2017 | Furr | ....................... | H04L 67/16 |
| 2017/0331669 A1* | 11/2017 | Ganesh | ............... | H04L 41/0213 |
| 2017/0373990 A1* | 12/2017 | Jeuk | ........................ | H04L 69/22 |
| 2018/0107740 A1* | 4/2018 | Galatzer | ................... | G06F 8/60 |
| 2018/0324083 A1* | 11/2018 | Caire | .................... | H04L 45/124 |
| 2019/0149508 A1* | 5/2019 | Silvestro | ............. | H04L 61/1511 |
| 2019/0233895 A1* | 8/2019 | Kurzrock | ................. | C12Q 1/68 |

OTHER PUBLICATIONS

Bernard Wong et al: "ClosestNode.com", Operating Systems Review, vol. 40, No. 1, Jan. 1, 2006 (Jan. 1, 2006), pp. 62-64, XP058334063.

* cited by examiner

Fig. 4 ary figures. The invention
EXPLICIT SERVICE FUNCTION CHAINING (SFC) USING DNS EXTENSIONS

CROSS-REFERENCE TO PRIOR APPLICATIONS

This application is a U.S. National Stage Application under 35 U.S.C. § 371 of International Application No. PCT/EP2017/055743 filed on Mar. 10, 2017. The International Application was published in English on Sep. 13, 2018 as WO 2018/162087 A1 under PCT Article 21(2).

FIELD

The present invention relates to a method and device for service function chaining within an end-to-end path of a network connection between a source node and a destination node.

BACKGROUND

In the state of the art, there are several SFC (Service Function Chaining) approaches which focus on providing mechanism to build a chain of services with network techniques, e.g., NSH (Network Services Header), MAC rewriting, etc., with some focusing on encrypted traffic, e.g., mcTLS (as described in D. Naylor et al.: "Multi-Context TLS (mcTLS): Enabling Secure In-Network Functionality in TLS", in *ACM SIGCOMM Computer Communication Review*, Vol. 45, No. 4, ACM, 2015). However, most of the works (i.e., mcTLS excluded) approach the problem of SFC within a single administrative domain (e.g., data center networks, mobile networks, etc.), thus assuming full knowledge and control of the underlying network. Moreover, all the works in the state of the art assume that the SFC is enforced—transparently to the users—by the ISP and/or content provider.

Specifically, two approaches are available in the current state of the art in order to resolve a service function chain SFC: The so-called 'straw man approach', where a client as a source node of a network connection resolves the entire SFC on its own, and the so-called 'greedy approach', where each hop resolves the respective next hope of the SFC. In both cases, the resulting network path will be suboptimal in most of the cases, which causes unsatisfactory user experience, in particular in terms of network delays.

SUMMARY

A method for service function chaining within an end-to-end path of a network connection between a source node and a destination node includes: executing, for a defined service function chain including an ordered sequence of selected network service functions, an address resolution process that translates names of the selected network service functions of the defined service function chain into their corresponding IP addresses. The address resolution process is performed at a name server of the destination node by a sequence of name server queries sent in succession to respective name servers of each of the selected network service functions of the defined service function chain in accordance with their order. Each of the name server queries is answered by a response from a name server of the respective network service function that includes IP addresses of selected instances of a respective network service function chosen by the respective name server according to predefined criteria.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In view of the above, the present invention to improves and further develops a method for service function chaining within an end-to-end path of a network connection and an apparatus for supporting such service function chaining in such a way that the above issues are overcome or at least partially alleviated.

In accordance with the invention, an embodiment provides a method for service function chaining within an end-to-end path of a network connection between a source node and a destination node, the method including: executing, for a defined service function chain including an ordered sequence of selected network service functions, an address resolution process that translates names of the network service functions of the service function chain into their corresponding IP addresses. The address resolution process is performed at a name server of the destination node by means of a sequence of name server queries sent in succession to respective name servers of each of the network service functions of the service function chain in accordance with their order. Each of the name server queries is answered by a response from a name server of the respective network service function that includes the IP addresses of selected instances of the respective network service function chosen by the respective name server according to predefined criteria.

Furthermore, an embodiment of the present invention provides an apparatus for supporting service function chaining within an end-to-end path of a network connection between a source node and a destination node. The apparatus includes a name server component configured to execute, for a defined service function chain including an ordered sequence of selected network service functions, an address resolution process that translates names of the network service functions of the service function chain into their corresponding IP addresses. The name server component is further configured to perform the address resolution process by means of a sequence of name server queries sent in succession to respective name servers of each of the network service functions of the service function chain in accordance with their ordered sequence, and to receive as answers to the name server queries responses from a name server of the respective network service functions, wherein each response includes the IP addresses of selected instances of the respective network service function chosen by the respective name server according to predefined criteria.

According to the invention, it has been recognized that the process of resolving a service function chain SFC can be improved in terms of the optimality of the resulting network path by performing a sequence of DNS queries that are sent in succession to respective authoritative DNS servers of each of the network service functions of the service function chain in accordance with their ordered sequence. Each of these name server queries is answered by a response from a name server of the respective network service function, wherein each response includes the IP addresses of selected instances of the respective network service function chosen by the respective name server according to predefined criteria. Embodiments of the invention support third-party service functions (e.g., multiple independent service function providers) within a name server architecture, such as the DNS architecture, and enable users and/or content provider to introduce additional services (e.g., parental control, transcoding, CDN, etc.) within the end-to-end path of network connection. Embodiments of the invention are based on an extension of the Domain Name System (DNS) and allow a user to benefit from shorter network delays when using several in-network services on the end-to-end path.

Aspects of the invention extend to corresponding systems, methods, and computer program products such as computer readable storage media having instructions stored thereon which are operable to program a programmable processor to carry out a method as described in the aspects and embodiments set out below or recited in the claims and/or to program a suitably adapted computer to provide the apparatus recited in any of the claims.

In accordance with the general definition, as specified, e.g., under https://en.wikipedia.org/wiki/Name_server, a name server in the context of the present invention is understood to be "a computer Hardware or software server that implements a network service for providing responses to queries against a directory service. It translates an often humanly-meaningful, text-based identifier to a system-internal, often numeric identification or addressing component. This service is performed by the server in response to a service protocol request."

As regards related work that motivates the present invention, mcTLS (as already mentioned above) should be considered, which is a protocol proposal extending the current implementation of TLS. More in detail, it enables to insert middleboxes within encrypted end-to-end connections. Moreover, it enables to share only part of the data—defined as encryption context—to which it is possible to enable different permissions to different middleboxes. However, mcTLS assumes that a client knows, in advance, the IP addresses of the middleboxes to insert within the end-to-end path. Embodiments of the present invention, however, solve a problem of middlebox selection, which is complementary to the mcTLS protocol. With embodiments of the invention, a DNS answer will contain the IP addresses of the middleboxes (hereinafter sometimes synonymously termed 'instances') to introduce within the end-to-end path that will be used to establish mcTLS connections. Consequently, an increased usage of the mcTLS protocol would enhance the value of the present invention while, on the other hand, the present invention is not limited to it.

According to an embodiment, the source node may be a client, while the destination node may be a server, in particular a content server.

According to an embodiment, the address resolution process may be executed by an authoritative DNS server of the destination node. Alternatively, the address resolution process may be offloaded to a dedicated authoritative DNS server instance.

According to an embodiment, each DNS query of the sequence of DNS queries may be answered by a DNS answer that includes a list of IP addresses of instances of the respective network service function chosen by the respective authoritative DNS server according to predefined criteria. The list may include a predefined number of IP addresses, wherein the number may be configurable according to the actual application scenario and requirements.

According to an embodiment, in the first DNS query of the sequence of DNS queries, the DNS query source is set to be the source node's IP address, either to the full IP address or to a truncated version, in order to comply with privacy and/or security policies.

According to an embodiment the subsequent DNS queries, i.e. each but the first DNS query of the sequence of DNS queries, may be extended to contain a first extension section that includes, as an indication of a possible source of the respective DNS query, the list of IP addresses returned as DNS answer to the respective previous DNS query. For this indication, as an alternative to implementing an extension section, the appropriately amended 'source section' of conventional DNS may be used instead.

According to an embodiment, each DNS query of the sequence of DNS queries may be extended to contain a second extension section, hereinafter sometimes denoted 'SFC next service section', indicating the domain name of the respective next network service function of the service function chain. In case of the last DNS query, this section may indicate the name of the destination node.

According to an embodiment, a sub-network graph that is composed of the entirety of instances returned as DNS answers to the sequence of DNS queries may be extracted from the complete network graph. Then, the network costs among the nodes of the extracted sub-network graph may be evaluated, for instance by means of network monitoring or by enhanced collaboration among the involved parties. The evaluated network costs may be taken into consideration according to predefined criteria in order to transform the extracted sub-network graph into a weighted sub-network graph.

According to an embodiment, a shortest path algorithm may be applied on the weighted sub-network graph. The resulting shortest path may then be provided as a DNS answer to the source node's local DNS, which may forward the solution to the source node. Applicable shortest path algorithms may include, but not limited to, the Dijkstra algorithm (as described, for instance, in Edsger W. Dijkstra: "A note on two problems in connexion with graphs", in Numerische Mathematik. 1, 1959, S. 269-271), Bellmann-Ford (as described, for instance, in R. E. Bellman: "On a Routing Problem", in Quarterly of Applied Mathematics. 16(1)/1958. Brown University, S. 87-90), or Johnson as described, for instance, in S. M. Johnson: "Optimal two- and three-stage production schedules with setup times included", in Naval Research Logistics Quarterly, vol. 1, iss. 1, 1954).

According to an embodiment, a DNS answer sent from the destination node's authoritative DNS server to the source node is extended to contain a first extension section, hereinafter sometimes denoted 'SFC answer section', that includes a list of domain names and corresponding IP addresses of all network service functions of the service function chain.

According to an embodiment, a DNS answer sent from the destination node's authoritative DNS server to the source node is extended to contain a second extension section, hereinafter sometimes denoted 'SFC authority section', that includes a list of the authoritative DNS servers of all network service functions of the service function chain.

There are several ways how to design and further develop the teaching of the present invention in an advantageous way. To this end it is to be referred to the dependent patent claims on the one hand and to the following explanation of preferred embodiments of the invention by way of example, illustrated by the drawings on the other hand. In connection with the explanation of the preferred embodiments of the invention by the aid of the drawings, generally preferred embodiments and further developments of the teaching will be explained.

In general, a single service discovery is done through an address resolution process which translates a domain name, such as 'www.example.com' into the corresponding IP address. This task is performed by a network name to address resolution system, such as the DNS system. Nonetheless, the address resolution process is used to improve other aspects of the communication. For instance, it is used to load balance the traffic among multiple instances of the same service and for Content Delivery Networks (CDN) in order to return the closest instance with that particular content.

With the same concept but applied to the SFC problem space, SFC resolution is the process to translate a chain of service names (e.g., 'A.com', 'B.com', 'www.example.com') into the corresponding IP addresses. Therefore, the SFC resolution process can be seen as a shortest path problem in a network graph composed of network nodes belonging to multiple independent domains (e.g., content server and third-party service function providers).

Figure 1:
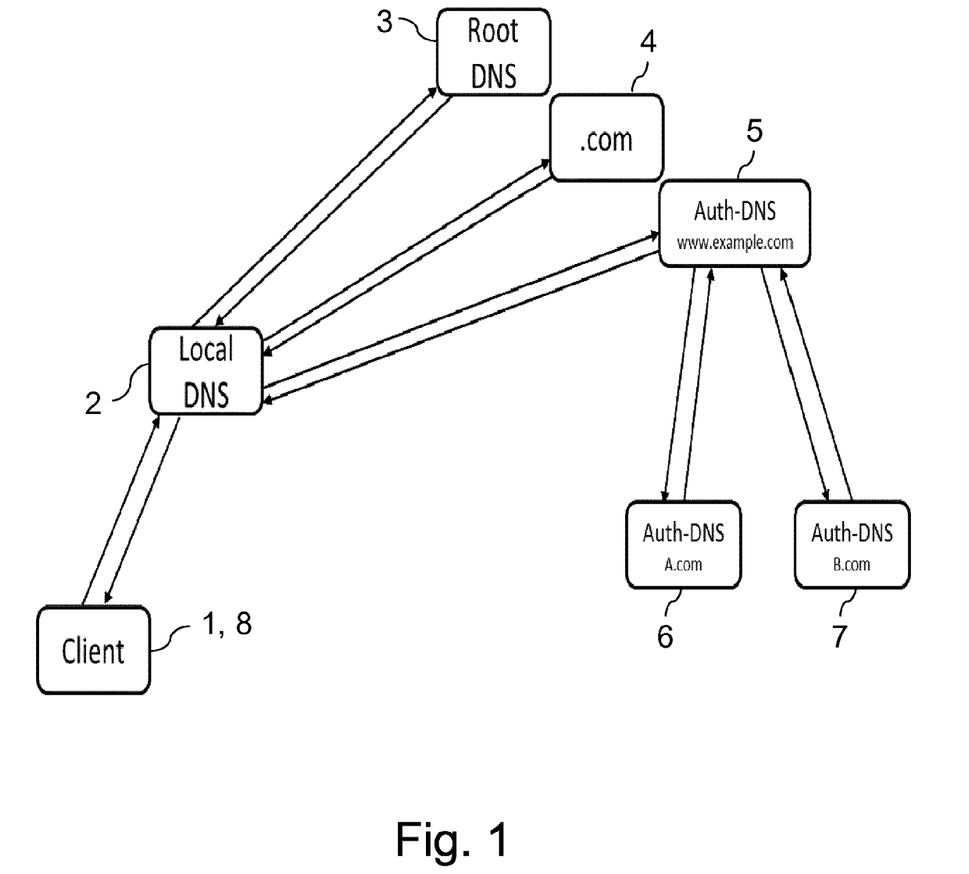
FIG. 1 is a schematic view illustrating the overall concept of service function chaining in a network.

FIG. 1 shows all the entities involved while a client 1, which is assumed to be the source node 8 of a network connection with a destination node, performs a DNS query. The client 1 sends a first DNS query to the local DNS server 2, which acts as a recursive DNS, i.e. it resolves all the DNS hierarchy until it is able to answer the client's 1 request. The Root DNS server 3 and the .com DNS server 4 act as iterative DNS, which means that they answer DNS queries with a pointer to the DNS responsible for that specific domain. Thus, the local DNS 2 forwards the query to the authoritative DNS server 5 for the domain 'www.example.com'. The authoritative DNS 5 for the content server 'www.example.com' is the entity which may define a list of service functions (e.g. 'A.com' and 'B.com'), the traffic from the client 1 must traverse. For this reasons, it can be assumed that it is the entity which takes the overhead to resolve the SFC resolution problem.

One of the issues the problem exhibits is the cooperation among heterogeneous and independent systems. The authoritative DNS 5 for the content server—or, more generally, for the destination node of the network connection—(e.g., 'www.example.com') belongs to an administrative domain, which is typically different from the authoritative DNS severs 6, 7 of third-party services (e.g. 'A.com' and 'B.com') introduced in the end-to-end path. Thus, the authoritative DNS 5 for the destination node, e.g. content server 'www.example.com', needs to find out the shortest path which traverses all the service functions, while having a limited visibility on the full network graph. This problem stresses the importance of the collaboration among the parties (e.g., authoritative DNS 6, 7 of all the service functions), which would lead to an improved final solution. A full collaboration would enable to gain knowledge of the whole network graph, with the possibility to apply on it one of the shortest path algorithms available in the state of the art (e.g., the well-known Dijkstra algorithm). However, without any enhanced collaboration, the SFC resolution process can be defined as a shortest path problem where the destination node's authoritative DNS 5 has limited visibility over the network graph.

Figure 2:
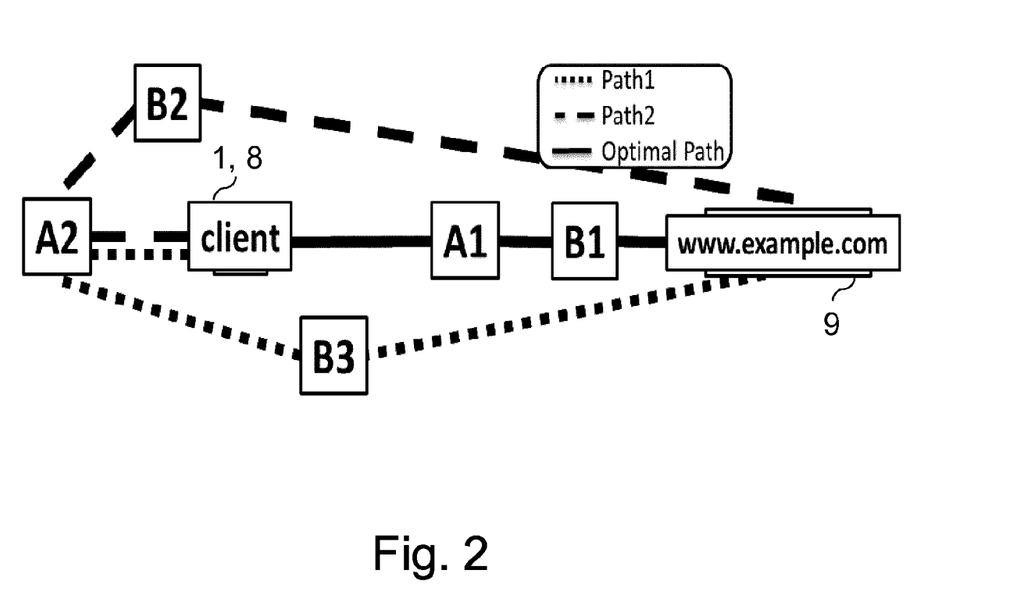
FIG. 2 is a schematic view illustrating two different SFC discovery problem examples according to prior art.

FIG. 2, which basically relates to the same scenario as FIG. 1 and wherein like reference numerals denote like components, shows a simple example of a network graph, which includes the client 1 as the source node 6 of the network connection, the single instance of the content server 'www.example.com' as destination node 9 of the network connection, and the services' instances. Specifically, in FIG. 2 two instances A1, A2 of network service function 'A.com' and three instances B1, B2, B3 of network service function 'B.com' are depicted. The network costs are represented by the edge lengths, and it may be assumed that the best instance is considered in terms of network distance (e.g., the closest to the source).

As already briefly mentioned above, two possible approaches are available in the current state of the art in order to resolve a SFC.

Figure 3:
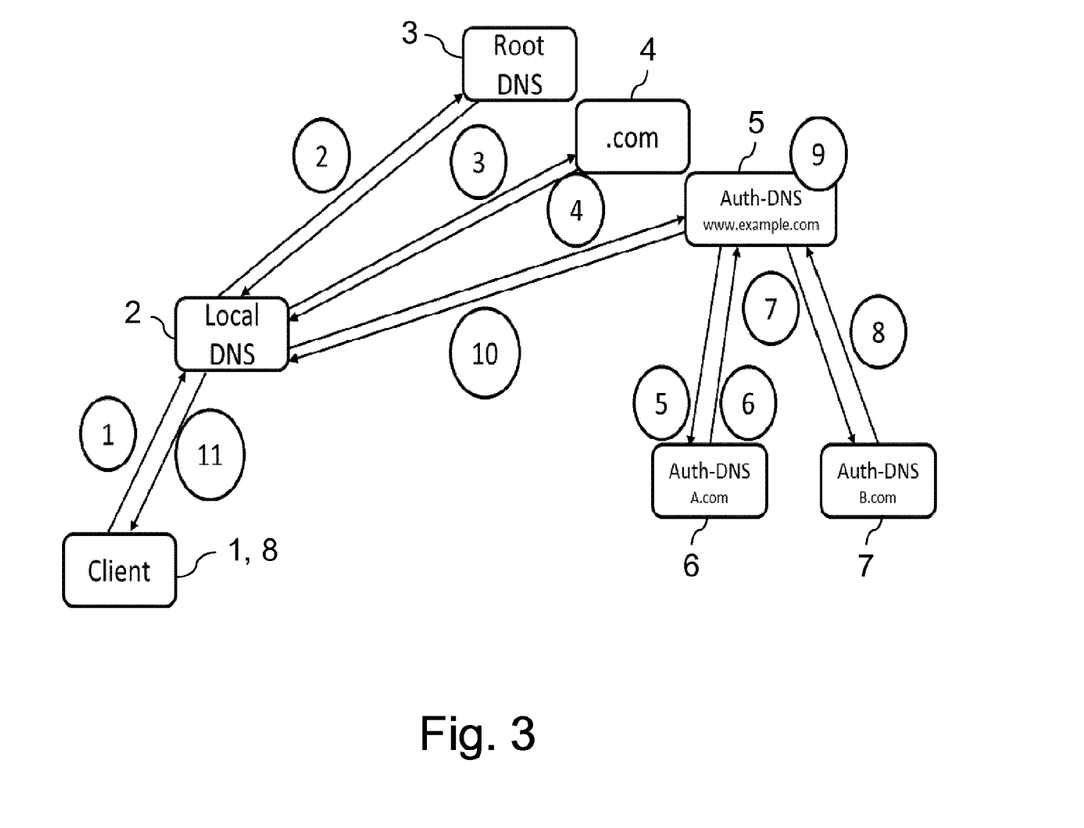
FIG. 3 is a schematic view illustrating an overall architecture and the process of SFC resolution in accordance with an embodiment of the present invention.

The straw man approach is the simplest approach. Here, the client 1 sends multiple DNS requests to resolve 'A.com', 'B.com' and 'www.example.com'. Thus, the client 1 performs 3 DNS requests, as follows:
1. Client.resolve (A)→A2
2. Client.resolve (B)→B3
3. Client.resolve(www.example.com)→www.example.com The resulting path, namely "Path1" (dotted line) is client→A2→B3→www.example.com The greedy algorithm is a well-known approach which performs the local optimal choice at each hop with the hope of finding the global optimum. Thus, the number of DNS requests is the same of the straw man case. However, in the previous case the client 1 resolves all the nodes, while in this case each hop resolves its next hop, as follows:
1. Client.resolve(A)→A2
2. A2.resolve(B)→B2
3. B2.resolve(www.example.com)→www.example.com The resulting path, namely "Path2" (dashed line), is therefore client→A2→B2→www.example.com Observing FIG. 2, it can easily be recognized that none of the previous result paths represent the optimal path. The optimal path, as indicated by the solid line is client→A1→B1→www.example.com FIG. 3 shows an overall architecture (which basically corresponds to the architecture represented in FIG. 1) and how the parts involved in the overall architecture interact with each other according to an embodiment of the present invention. Like in the previous figures, the illustrated embodiment relates to a scenario where a client 1, which acts as source node 8, has a network connection with a content server ('www.example.com' in the illustrated embodiment), which acts as destination node, with two service functions being introduced within the end-to-end path between the client 1 and the content server. These two service functions, termed 'A.com' and 'B.com', constitute an ordered service function chain of network service functions, wherein 'A.com' is assumed to be executed first and 'B.com' is assumed to be executed second. Although not explicitly shown in FIG. 3, it is to be understood that the service function chain, SFC, may include a different number of service functions, e.g. only a single service function or more than two service functions, as will be easily appreciated by those skilled in the art.

According to the illustrated embodiment, in a first step, indicated by the encircled numbers, the client 1 sends a DNS query to its local DNS 2 in order to resolve the domain 'www.example.com'.

In reaction to the DNS query received from the client 1, the local DNS 2 sends a DNS query to the Root DNS 3 to resolve the authoritative DNS 4 for '.com', as illustrated in step 2.

Next, as illustrated in step 3, the local DNS 3 sends a DNS query to the '.com' DNS 4 to resolve the authoritative DNS 5 for the domain 'www.example.com'.

As shown at step 4, the local DNS 2 forwards the client's 1 query to the authoritative DNS 5 for the domain 'www.example.com', as resolved at the previous step 3.

The steps 1, 2, 3 and 4 as described above basically correspond to the conventional behavior of existing DNS systems. The following steps, however, incorporate various aspects in accordance with embodiments of the present invention.

As shown at step 5, the content server's authoritative DNS 5 sends a DNS query to the authoritative DNS 6 of 'A.com', which is the first service function of the SFC. More in detail, as shown in Table 2 below, the query source is set to be the client's 1 IP address (or a truncated version, e.g., for user privacy reasons). Moreover, the query includes the next hop of the chain (i.e., 'B.com').

Responsive to the DNS query, as shown at step 6, the authoritative DNS 6 for 'A.com' returns a set of addresses of instances of the service function 'A.com', which are selected by taking into account the next hop of the chain (i.e., 'B.com'). This is in contrast to the existing prior art solutions, where the DNS's answer is only based on the requester's source address information. The number of the returned instances may be configurable or may be predefined and set to a reasonable and practicable value, e.g., the best five addresses.

The same process is repeated for all subsequent service functions of the SFC, i.e. in the illustrated embodiment for service function 'B.com'. That is, the content server's 5 authoritative DNS sends a DNS query to the authoritative DNS 7 of 'B.com', as shown at step 7. More in detail, as shown in Table 2 below, the query includes as query source the best instances of the immediately preceding service function of the SFC received at the previous step. Again, this is in contrast to existing prior art solutions according to which queries only include a single source. Moreover, the query includes the next hop of the chain, which might be another service function or, like in the illustrated embodiment, the destination node of the network connection, i.e. content server 'www.example.com'.

Responsive to this DNS query, as shown at step 8, the authoritative DNS 7 of 'B.com' returns a set of addresses of instances of the service function 'B.com' to the content server's authoritative DNS 5, for instance also the best five, like in the previous case of 'A.com'. In contrast to prior art solutions, such set is evaluated by taking into account both a set of IP query sources—i.e., in the illustrated embodiment this set is composed of five instances of the preceding service function 'A.com' (or truncated versions thereof), as resulting from above step 5—and the next hop of the SFC, which in the illustrated embodiment is represented by the content server 'www.example.com' as destination source.

As indicated at step 9 and as will be described in greater detail below in connection with FIG. 4, the content server's authoritative DNS 5 resolves the SFC resolution problem by applying a shortest path algorithm (e.g., the well-known Dijkstra algorithm) on the sub-network graph that is composed of the client 1, the service function instances returned by the authoritative DNS of 'A.com' and 'B.com', respectively, and the content server (that is supposed to be composed of a single instance).

As shown at step 10, the content server's authoritative DNS 5, based on the outcome of step 9, answers the client's 1 DNS query to the client's 1 local DNS 2. This DNS answer includes two newly defined sections, termed 'SFC Answer Section' and 'SFC Authority Section', as will be described in greater detail below in connection with Table 1.

Finally, as shown at step 11, the client's 1 local DNS 2 forwards the DNS answer received from the authoritative DNS 5 of the content server (i.e., 'www.example.com') to the client 1.

The service function chain may be explicitly enforced by the client's 1 ISP and/or content provider. For instance, while a user is connecting to a content server (e.g., 'www.example.com'), the content server may declare that all the traffic addressed to it has to pass through an ordered list of selected service functions (e.g., in the above embodiment of FIG. 3 the two service functions 'A.com' and 'B.com'). It should be noted that the selected service functions may be provided by different providers and may, thus, belong to different independent domains.

In order to enforce the explicit SFC paradigm mentioned above, embodiments of the invention introduce two additional DNS answer's sections. While the conventional DNS answer includes a Question Section, an Answer Section and an Authority Section, the introduced extension includes the following sections:

A section termed 'SFC Answer Section' that includes a list of domain names and corresponding IP addresses of the service functions.

A section termed 'SFC Authority Section' that includes the authoritative DNS for the service functions presented in the SFC answer section.

Table 1 shows an example of a DNS answer extended according to an embodiment of the invention including the new SFC sections. More in detail, the conventional answer section and the conventional authority section are not changed for backward compatibility reasons. Consequently, a client that does not support the new SFC sections will still get the IP address of the required domain and the authoritative DNS information in the original fields, being able to ignore the new extension.

TABLE 1

DNS answer according to an embodiment of the invention

```
;; ->>HEADER<<- opcode: QUERY, status: NOERROR, id: 25778
;; flags: qr aa rd ra; QUERY: 1, ANSWER: 3, AUTHORITY: 3, ADDITIONAL: 0
;; QUESTION SECTION:
; www.example.com.                         IN      A
;; ANSWER SECTION:
www.example.com.              300          IN      A       199.99.22.39
```

TABLE 1-continued

DNS answer according to an embodiment of the invention

```
;; SFC ANSWER SECTION:
A.com.                        300      IN    A     199.99.22.37
B.com.                        300      IN    A     199.99.22.38
;; AUTHORITY SECTION:
www.example.com.              93375    IN    NS    ns1.www.example.com.
;; SFC AUTHORITY SECTION:
A.com.                        93375    IN    NS    ns1.a.com.
B.com.                        93375    IN    NS    ns1.b.com.
```

DNS Answer According to an Embodiment of the Invention

Once an explicit SFC has been set up, a shortest path problem has to be solved on a network graph on which the destination node of the network connection (i.e. content server 'www.example.com' in the above embodiment) has limited visibility only. According to an embodiment of the invention a Service Function Chain Discovery is executed, which denotes a process to resolve the IP addresses associated to the explicit service chain (i.e., 'A.com' and 'B.com' in the above embodiment). The standard address resolution process currently translates only a single domain name (e.g., 'www.example.com') into the corresponding IP address. In contrast, embodiments of the invention enhance the DNS capabilities in order to support the resolution process for a chain of services, as will be described hereinafter in detail.

Since generally the content server's (or, more generally, the destination node's) authoritative DNS 5 has limited visibility on the network graph, a technique to extract a relevant sub-network graph is introduced, which leads to an enhanced path selection. Moreover, an extension is added for the DNS queries in order to improve the relevance of the extracted sub-network graph.

Figure 4:
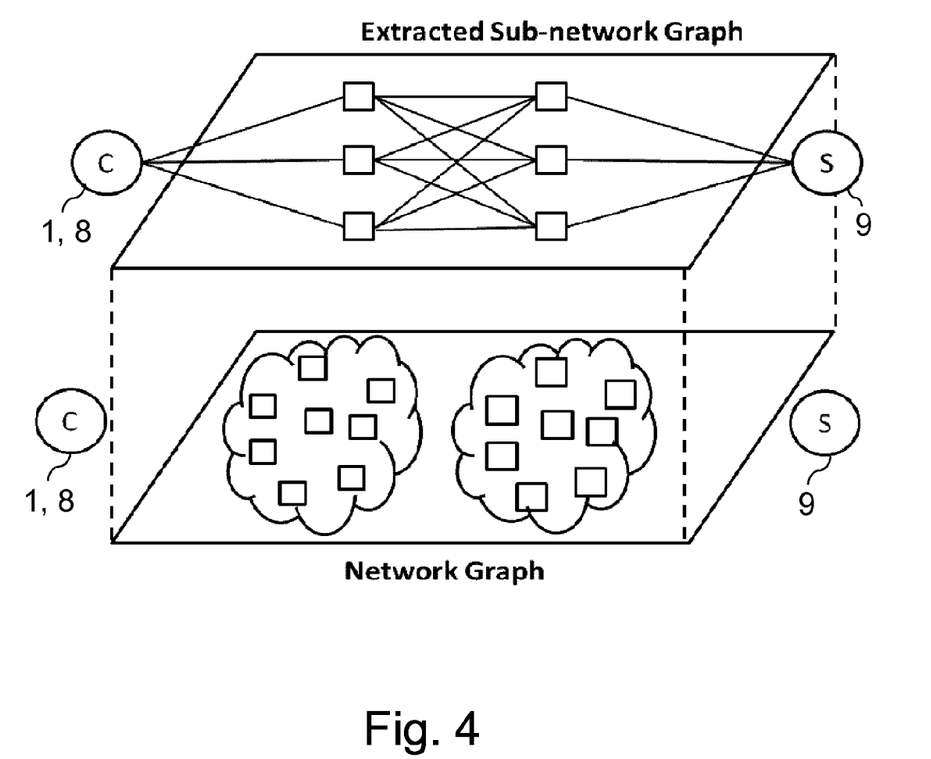
FIG. 4 is a schematic view illustrating the process of extracting a sub-network graph from the complete network graph in accordance with an embodiment of the present invention.

Referring to FIG. 4, this figure illustrates the process of path selection through sub-network graph definition and resolution. Specifically, in the bottom part, FIG. 4 shows the full network graph, which is composed of the client 1 as the source node 8 of a network connection, the content server as the destination node 9 of the network connection, and all the middleboxes/instances for each selected in-network service that traffic sent from the source node 8 to the destination node 9 has to pass. The network may include a multi-domain environment where, e.g., each service function belongs to an independent domain. According to the illustrated embodiment the process to extract a sub-network graph, which is depicted in the upper part of FIG. 4, is composed of two phases:

The first phase is the node discovery phase, which is the process of finding out service instances without multi-domain collaboration. According to an embodiment the node discovery is performed by sending out a set of DNS requests to the authoritative DNS of each selected service. Each DNS answer contains a set of IP addresses (e.g., the best three) that are chosen considering several predefined or configurable parameters, such as network distance (e.g., RTT), load balance, etc. The result of this phase is a sub-network graph, which is shown in the upper part of FIG. 4. More in detail, the sub-network graph is composed of the middleboxes that were returned by the authoritative DNS 6, 7 of the in-network services.

The second phase is the network cost discovery phase, which is the process of finding out the network costs among the nodes of the sub-network graph discovered or identified in the previous phase. In this context it is important to note that it is not necessary to determine the cost between each pair of nodes in the sub-network graph, since the SFC is defined by an ordered set of services the traffic must traverse. Thus, even if the underlying sub-network graph is fully connected, only a subset of the edges of the full sub-network graph has to be considered. In particular, according to an embodiment only the edges from all the instances of a defined hop to the previous and subsequent hop instances will be considered. In contrast, the edges among the instances of the same service will not be considered. In other words, the cost discovery phase, which is represented by the process of finding the edges cost for the edges that connect the nodes of the extracted sub-network graph is simplified by the particular aspect of this graph to be not complete since the instances of each in-network service are connected only to the next service's instances and to the previous service's instances. This approach reduces the overall number of edges, which directly results in a reduction of the overall problem complexity of applying a shortest path algorithm. It is implemented considering the order of the answer obtained and through network monitoring actions.

The sub-network graph resolution is the process of finding the shortest path on the defined sub-network graph. After the node discovery phase, as described above, a non-weighted sub-network graph is available. Without the edges cost, the only approach which can be applied is the "greedy" approach, which means that at each hop of the SFC the first instance received in the respective DNS answer will be selected. Instead, in order to build a weighted sub-network graph, a Network Cost Discovery phase will be executed. This Network Cost Discovery phase, as already briefly mentioned above, is performed in order to find out the weights of the extracted sub-network graph edges. After the cost discovery phase, a shortest path algorithm can be applied on the weighted sub-network graph.

Specifically, this phase is represented by the process of finding out the network cost of the sub-network graph extracted from the complete network graph. According to an embodiment the process can be performed by extending the collaboration among the parties, for instance by exchanging information on the links cost. Alternatively or additionally, the process can be performed through monitoring activities within the network.

Once network costs have been determined, they can be employed—in accordance with pre-determinable policies or criteria—in order to create a weighted sub-network graph. On such weighted sub-network graph several algorithms can be applied in order to solve the shortest path problem (e.g., Dijkstra, Bellman-Ford, Johnson, etc.).

Apparently, the quality of the shortest path solution is dependent on the relevance of the sub-network graph extracted from the complete network graph. Thus, in order to improve the solution, it is needed to improve the accuracy of the extraction of service function nodes/instances/middleboxes from the full network graph. In other words, the accuracy of the solution against the best case (which would be achievable, e.g., in case of full network graph knowledge) depends on the capacity of the content server's authoritative DNS to discover service instances that are relevant for the problem.

According to an embodiment, in order to address this issue, extensions and/or amendments of conventional DNS queries may be provided. More in detail, a DNS query section that is already contained in conventional DNS queries, termed 'Source Section', may be amended to include a list of source IP addresses which could be the source of the traffic. Currently, according to prior art each DNS query includes only a single source IP address (or a truncated version thereof) that is used to optimize the DNS answer. According to an embodiment, the amended 'Source Section' may include the IP addresses of service instances chosen at the previous hop of the service function chain.

Furthermore, an additional DNS query section may be introduced, not yet contained in DNS queries according to prior art. This additional section, termed 'SEC NEXT SERVICE SECTION', may define the domain name of the next service in the service function chain. This aims to give a direction to the resolution algorithms in the authoritative DNS in the resolution process.

An embodiment of a DNS query including the above extensions and amendments is shown in Table 2 below.

TABLE 2

DNS query according to an embodiment of the invention

```
;; ->>HEADER<<- opcode: QUERY, status: NOERROR, id: 25778
;; flags: qr aa rd ra; QUERY: 1, SOURCE: 5, SFC NEXT SERVICE: 0,
ADDITIONAL: 0
;; QUESTION SECTION:
; www.example.com.                    IN   A
;; SOURCE SECTION:
www.previous_hop.com.        300      IN   A    199.99.22.X
www.previous_hop.com.        300      IN   A    199.99.23.X
www.previous_hop.com.        300      IN   A    199.99.24.X
www.previous_hop.com.        300      IN   A    199.99.25.X
www.previous_hop.com.        300      IN   A    199.99.26.X
;; SFC NEXT SERVICE SECTION:
www.next_hop.com.
```

To summarize, aspects of the invention provide modifications of existing network name to address resolution systems (such as DNS) to include one or more of the following information in name to address resolution requests and responses:

a) 'SFC Answer' and/or 'SFC Authority' sections in the response to provide the explicit notification of the selected middleboxes. This could be used by a protocol like mcTLS to establish the data connection. Thus, users are aware of the service functions introduced within the end-to-end path. In order to support this aspect, the authoritative DNS server of the destination node (e.g., content server) may be modified together with the client DNS library. The local DNS does not need to be modified, since it does not need to inspect the enhanced answer, but can just forward it to the source node of the network connection. It is noted that the extensions are mandatory only in case a client needs the selected in-network service instances to establish the data connection.

b) Extension of the 'Source Section' in the requests to include a set of IP source instead of a single IP address.

c) 'SFC Next Service Section' in the requests which includes information about the next hop of the chain.

Both aspects b) and c) can be is used to increase the accuracy of the sub-network graph extraction, i.e. to improve the instance selection in each service function's authoritative DNS. Thus the parts which need to be upgraded are the authoritative DNS for the service functions which are inserted in the end-to-end path and the content server authoritative DNS.

It is explicitly noted here that any combination of the aspects a), b) and c) may be incorporated in the invention, i.e. the aspects are complementary and can be used independently or in combination with each other.

Finally, aspects of the invention provide a method to resolve a shortest path problem with partial visibility on the network graph, based on the more accurate sub-network graphs produced through implementation of any of the above aspects a), b) and c).

An implementation of the method to extract nodes from a full network graph has been implemented by the inventors. A theoretical evaluation shows that the straw man solution has in average a +76% in path delay. The greedy approach shows a +35% in path delay including also a higher number of DNS queries (i.e., one per each hop to resolve). Applying a shortest path algorithm (e.g., Dijkstra) on the extracted sub-network graph build with the method according to the invention, instead, shows a +12% in path delay compared to the best case (e.g., Dijkstra on the full network graph). Nonetheless, upgrading the DNS functionalities can lead to a re-use of improvements already present in the current DNS architecture—such as caching—which can improve the time needed to find out the optimal solution.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for service function chaining within a network, the method comprising:
   receiving, by a domain name system ("DNS") server of a destination node, a DNS query from a source node, the DNS query including a request, from the source node, to access a network domain of the destination node;
   determining, by the destination node DNS server in response to the received DNS query, a service function chain that defines a plurality of network service functions through which network traffic from the source node must traverse before reaching the destination node network domain;
   performing, by the destination node DNS server, an address resolution process that translates the network service functions of the service function chain into respective internet protocol ("IP") addresses so as to determine an end-to-end network path from the source node through the plurality of network service functions to the network domain of the destination node, the address resolution process comprising:
      sending a respective DNS query to a respective DNS server of each of the plurality of network service functions, such that a separate DNS query is sent to each of the network service function DNS servers;
      receiving, from the respective network service function DNS server of each of the plurality of network service functions, a DNS response including a respective set of multiple IP addresses for accessing the respective network service function corresponding to the respective network service function DNS server such that a plurality of DNS responses, each including a respective set of multiple IP addresses, are separately and independently received; and
      selecting, based on respective network costs incurred in traveling from a respective domain of each respective network service function to a subsequent domain of each respective subsequent network service function in the service function chain, a single IP address from each respective set of multiple IP addresses so as to determine the end-to-end network path; and
   transmitting, by the destination node DNS server, a message, addressed to the source node, identifying each selected IP address included in the end-to-end network path.

2. The method according to claim 1, wherein a first DNS query sent to a first of the network service function DNS servers includes a full or truncated IP address of the source node.

3. The method according to claim 1, wherein the receiving, from the respective network service function DNS server of each of the plurality of network service functions, a DNS response includes receiving a first response to a first of the respective DNS queries, the first response being from a first of the network service function DNS servers and including a respective set of multiple first IP addresses for accessing the first network service function, and
   wherein the sending a respective DNS query to a respective DNS server of each of the plurality of network service functions, includes sending, after receiving the first response, a second of the respective DNS queries to a second of the network service function DNS servers, wherein the second DNS query comprises a plurality of the multiple first IP addresses for accessing the first network service function so as to enable the second network service function DNS server to consider network cost incurred in traveling from a domain of the first network service function to a domain of the second network service function.

4. The method according to claim 1, wherein the address resolution process comprises:
   transmitting, by the destination node DNS server to a first of the network service function DNS servers, an identity of a second network service function;
   wherein the first network service function DNS server is associated with a first network service function and the second network service function directly follows the first network service function in the service function chain.

5. The method according to claim 1, wherein the determining, by selecting a single IP address from each respective set of multiple IP addresses, the end-to-end network path comprises:
   constructing a first network graph, the first network graph comprising an IP address of the source node, a plurality of first IP addresses included in the respective set of multiple IP addresses included in a DNS response received from a first of the respective network service function DNS servers, and a plurality of second IP addresses included in the respective set of multiple IP addresses included in a DNS response received from a second of the respective network service function DNS servers;
   extracting, from the first network graph, a sub-network graph by selecting a subset of the first IP addresses and a subset of the second IP addresses to be included in the sub-network graph; and
   applying a shortest path algorithm on the sub-network graph so as to determine a shortest path that includes the single IP address from each respective set of multiple IP addresses.

6. The method according to claim 5, the method comprising:
   evaluating network costs among nodes of the extracted sub-network graph, and
   transforming the extracted sub-network graph into a weighted sub-network graph by considering the evaluated network costs according to predefined criteria.

7. The method according to claim 6, wherein the applying the shortest path algorithm on the sub-network graph is performed by applying the shortest path algorithm on the weighted sub-network graph.

8. The method according to claim 7, wherein the shortest path algorithm is a Dijkstra algorithm.

9. The method according to claim 1, wherein the message addressed to the source node identifies a respective DNS server of each of the network service functions.

10. The method according to claim 1, wherein the source node is a client and wherein the destination node is a server.

11. The method according to claim 10, wherein the destination node is a content server.

12. The method according to claim 1, wherein each of the network service functions belongs to a respective service function network domain, and wherein each of the respective service function network domains are external to the destination node network domain.

13. The method according to claim 1, wherein the determining, by selecting a single IP address from each respective set of multiple IP addresses, the end-to-end network path comprises:

constructing a first network graph, the first network graph comprising an IP address of the source node, an IP address of the destination node, and, for each respective network service function, the respective set of multiple IP addresses;

extracting, from the first network graph, a sub-network graph by selecting a subset of IP addresses from each respective set of multiple IP addresses; and applying a shortest path algorithm on the sub-network graph so as to determine a shortest path that includes the single IP address from each respective set of multiple IP addresses.

14. The method according to claim 1, wherein the wherein the determining, by selecting a single IP address from each respective set of multiple IP addresses, the end-to-end network path comprises:

constructing a first network graph, the first network graph comprising an IP address of the source node, an IP address of the destination node, and, for each respective network service function, the respective set of multiple IP addresses;

extracting, from the first network graph, a sub-network graph by selecting a subset of IP addresses from each respective set of multiple IP addresses;

transforming the extracted sub-network graph into a weighted sub-network graph by considering evaluated network costs according to predefined criteria; and applying a shortest path algorithm on the sub-network graph so as to determine a shortest path that includes the single IP address from each respective set of multiple IP addresses.

15. A computing system comprising one or more processors configured to instantiate a destination name server for supporting service function chaining within an end-to-end path of a network connection between a source node and a destination node, the destination name server being configured to, via the one or more processors, perform the method of claim 1.

16. A computing system comprising one or more processors configured to instantiate a destination name server for supporting service function chaining within an end-to-end path of a network connection between a source node and a destination node, the destination name server being configured to, via the one or more processors, perform the method of claim 2.

17. A computing system comprising one or more processors configured to instantiate a destination name server for supporting service function chaining within an end-to-end path of a network connection between a source node and a destination node, the destination name server being configured to, via the one or more processors, perform the method of claim 3.

18. A non-transitory computer readable medium comprising code for causing a computing system comprising one or more processors to perform the method according to claim 1.

19. A method of address resolution, the method comprising:

sending a respective DNS query to a respective DNS server of each of a plurality of network service functions, such that the first server sends a separate DNS query to each of the network service function DNS servers;

receiving, from the respective network service function DNS server of each of the plurality of service functions, a DNS response including a respective set of multiple IP addresses for accessing the respective service function corresponding to the respective service function DNS server such that a plurality of DNS responses, each including a respective set of multiple IP addresses, are separately and independently received;

selecting, based on respective network costs incurred in traveling from a respective domain of each respective network service function to a subsequent domain of each respective subsequent network service function in the service function chain, a single IP address from each respective set of multiple IP addresses so as to determine an end-to-end network path from a source node through the plurality of network service functions to a network domain of a destination node; and transmitting, to the source node, a message identifying each selected IP address in the end-to-end network path.

20. The method according to claim 19, wherein the determining, by selecting a single IP address from each respective set of multiple IP addresses, the end-to-end network path comprises:

constructing a first network graph comprising:

a plurality of first IP addresses included in the respective set of multiple IP addresses included in a DNS response received from a first of the network service function DNS servers, and a plurality of second IP addresses included in the respective set of multiple IP addresses included in a DNS response received from a second of the network service function DNS servers;

extracting, from the first network graph, a sub-network graph by selecting a subset of the first IP addresses and a subset of the second IP addresses to be included in the sub-network graph; and applying a shortest path algorithm on the sub-network graph so as to determine a shortest path that includes the single IP address from each respective set of multiple IP addresses.

* * * * *